(12) United States Patent
Bouilloux et al.

(10) Patent No.: US 6,864,318 B2
(45) Date of Patent: Mar. 8, 2005

(54) THERMOPLASTIC COMPOSITIONS COMPRISING A CROSSLINKED PHASE

(75) Inventors: Alain Bouilloux, Bernay (FR); Laurent Teze, Conflans Sainte-Honorine (FR)

(73) Assignee: ATOFINA, Puteaux (FR)

( * ) Notice: Subject to any disclaimer, the term of this patent is extended or adjusted under 35 U.S.C. 154(b) by 0 days.

(21) Appl. No.: 09/384,315

(22) Filed: Aug. 27, 1999

(65) Prior Publication Data

US 2003/0008976 A1 Jan. 9, 2003

(30) Foreign Application Priority Data

Aug. 27, 1998 (FR) .............................. 98 10895

(51) Int. Cl.$^7$ ................ C08L 23/08; C08L 63/02; C08L 67/03; C08L 77/02
(52) U.S. Cl. ............ 525/179; 525/64; 525/65; 525/66; 525/92 B; 525/92 F; 525/108; 525/111; 525/113; 525/166; 525/176; 525/182; 525/183; 525/423; 525/438
(58) Field of Search ................ 525/64, 65, 66, 525/92 B, 92 F, 108, 111, 113, 166, 176, 179, 182, 183, 423, 438

(56) References Cited

U.S. PATENT DOCUMENTS

| | | | |
|---|---|---|---|
| 5,162,422 A | * 11/1992 | Lausberg et al. | 525/179 |
| 5,208,292 A | 5/1993 | Hert et al. | 525/166 |
| 5,292,808 A | 3/1994 | Ohmae et al. | 525/113 |
| 5,373,055 A | 12/1994 | Ohmae et al. | 525/64 |
| 5,395,881 A | * 3/1995 | Spelthann | 525/185 |
| 5,405,909 A | * 4/1995 | Ohmae et al. | 525/176 |
| 5,407,999 A | 4/1995 | Hert et al. | 525/166 |
| 5,457,150 A | 10/1995 | Ohmae et al. | 525/64 |
| 5,777,033 A | 7/1998 | Venkataswamy et al. | 525/182 |

FOREIGN PATENT DOCUMENTS

| | | | |
|---|---|---|---|
| JP | 63-128059 A | * | 5/1988 |
| JP | 6-299052 A | * | 10/1994 |
| WO | 89/05838 | | 6/1989 |

OTHER PUBLICATIONS

Patent Abstract of Japan vol. 015, No. 206 (C–0835), May 27, 1991 & JP 03 059072 A (Unitika LTD), Mar. 14, 1991.

* cited by examiner

*Primary Examiner*—Robert Sellers
(74) *Attorney, Agent, or Firm*—Millen, White, Zelano & Brianigan, P.C.

(57) ABSTRACT

A composition comprising a thermoplastic polymer having incorporated therein a crosslinked phase derived from the reaction of:

(A) a copolymer made from ethylene and an unsaturated epoxide, a polyolefin grafted with an unsaturated epoxide, or a product having two epoxide groups, (B) a copolymer made from ethylene and an unsaturated carboxylic acid anhydride, and (C) a copolymer made from an unsaturated carboxylic acid or an $\alpha,\omega$-aminocarboxylic acid.

26 Claims, No Drawings

THERMOPLASTIC COMPOSITIONS COMPRISING A CROSSLINKED PHASE

FIELD OF THE INVENTION

The present invention relates to thermoplastic compositions comprising a crosslinked phase.

BACKGROUND OF THE INVENTION

Thermoplastic polymers, such as, for example, polyamides or saturated polyesters (PET and PBT), have to be modified, either in order to be able to withstand impacts, in particular at low temperature, or in order to modify their flexural modulus. This modification consists in incorporating polyolefins or rubbers in the said thermoplastics. When polyolefins are incorporated in these thermoplastics, it is useful for these polyolefins to be crosslinked. This crosslinking is useful in order to obtain a high viscosity of this polyolefinic phase and therefore, for example, to promote the dispersion of these polyolefins in the thermoplastic matrix. This crosslinking can also be useful, for example, in order for the polyolefinic phase which contributes impact strength not to penalize the temperature behaviour and/or the thermal ageing of a polyamide.

U.S. Pat. No. 5,208,292 discloses PETs and PBTs modified by a mixture of functionalized polyolefins which react with one another. It concerns the reaction of an ethylene/alkyl acrylate/glycidyl methacrylate copolymer with an ethylene/alkyl acrylate/maleic anhydride copolymer. A catalyst is also added to promote this reaction. This catalyst is, for example, a tertiary amine or phosphines.

EP 400890 discloses PETs and PBTs comprising ethylene/alkyl acrylate/glycidyl methacrylate copolymers crosslinked by:
  either diamines
  or copolymers comprising maleic anhydride
  or copolymers having OH functional groups
  or diacids or ethylene/(meth)acrylic acid copolymers
  or amino acids.

EP 382539 discloses polyamides comprising ethylene/alkyl acrylate/maleic anhydride copolymers crosslinked by diamines or products having two OH functional groups.

These crosslinkings are sometimes inadequate or are not carried out reproducibly.

SUMMARY OF THE INVENTION

The present invention relates to a thermoplastic composition comprising a thermoplastic polymer, in which polymer is incorporated a crosslinked phase originating from the reaction:
  of (A) comprising an unsaturated epoxide or a compound containing 2 epoxide functional groups
  of (B) comprising an unsaturated carboxylic acid anhydride
  of (C) comprising an unsaturated carboxylic acid or of an α,ω-aminocarboxylic acid.

Mention may be made, by way of examples of thermoplastic polymers, of saturated polyesters, of polyamides or of alloys of saturated polyesters with polycarbonate.

The term "polyester" denotes polymers which are saturated condensation products of glycols and of dicarboxylic acids or of their derivatives. They preferably comprise the condensation products of aromatic dicarboxylic acids having from 8 to 14 carbon atoms and of at least one glycol chosen from the group consisting of neopentyl glycol, cyclohexanedimethanol and aliphatic glycols of formula $HO(CH_2)_nOH$ in which n is an integer having a value from 2 to 10. Up to 50 mol % of the aromatic dicarboxylic acid can be replaced by at least one other aromatic dicarboxylic acid having from 8 to 14 carbon atoms and/or up to 20 mol % can be replaced by an aliphatic dicarboxylic acid having from 2 to 12 carbon atoms.

The preferred polyesters are poly(ethylene terephthalate) (PET), poly(1,4-butylene terephthalate) (PBT), poly(1,4-cyclohexylenedimethylene terephthalate/isophthalate) and other esters derived from aromatic dicarboxylic acids, such as isophthalic acid, bibenzoic acid, naphthalenedicarboxylic acid, 4,4'-diphenylenedicarboxylic acid, bis(p-carboxyphenyl)methane, ethylenebis(p-benzoic acid), 1,4-tetramethylenebis(p-oxybenzoic acid), ethylenebis(para-oxybenzoic acid), or 1,3-trimethylenebis(p-oxybenzoic acid), and from glycols, such as ethylene glycol, 1,3-trimethylene glycol, 1,4-tetramethylene glycol, 1,6-hexamethylene glycol, 1,3-propylene glycol, 1,8-octamethylene glycol or 1,10-decamethylene glycol. The MFI of these polyesters, measured at 250° C. under 2.16 kg, can vary from 2 to 100 and advantageously from 10 to 80.

The term "polyamide" is understood to mean the condensation products:
  of one or more amino acids, such as aminocaproic, 7-aminoheptanoic, 11-aminoundecanoic and 12-aminododecanoic acids, or of one or more lactams, such as caprolactam, oenantholactam and lauryllactam;
  of one or more salts or mixtures of diamines, such as hexamethylenediamine, dodecamethylenediamine, meta-xylylenediamine, bis-(p-aminocyclohexyl)methane and trimethylhexamethylenediamine, with diacids, such as isophthalic, terephthalic, adipic, azelaic, suberic, sebacic and dodecanedicarboxylic acids;
  or of the mixtures of some of these monomers which results in copolyamides, for example PA-6/12 by condensation of caprolactam and of lauryllactam.

Polyamide mixtures can be used.

Mention may be made, by way of examples of (A), are those comprising ethylene and an unsaturated epoxide.

According to a first form of the invention, (A) is either a copolymer of ethylene and of an unsaturated epoxide or a polyolefin grafted with an unsaturated epoxide.

As regards the polyolefin grafted with an unsaturated epoxide, the term "polyolefin" is understood to mean polymers comprising olefin units, such as, for example, ethylene, propylene, 1-butene or any other alpha-olefin units. Mention may be made, by way of example, of
  polyethylenes, such as LDPE, HDPE, LLDPE or VLDPE, polypropylene, ethylene/propylene copolymers, EPRs (ethylene/propylene rubber) or PE metallocenes (copolymers obtained by monosite catalysis),
  styrene/ethylene-butene/styrene (SEBS) block copolymers, styrene/butadiene/styrene (SBS) block copolymers, styrene/isoprene/styrene (SIS) block copolymers, styrene/ethylene-propylene/styrene block copolymers or ethylene/propylene/dienes (EPDM);
  copolymers of ethylene with at least one product chosen from salts or esters of unsaturated carboxylic acids or vinyl esters of saturated carboxylic acids.

The polyolefin is advantageously chosen from LLDPE, VLDPE, polypropylene, ethylene/vinyl acetate copolymers or ethylene/alkyl (meth)acrylate copolymers. The relative density can advantageously be between 0.86 and 0.965 and the melt flow index (MFI) can be between 0.3 and 40 (in g/10 min at 190° C. under 2.16 kg).

As regards the copolymers of ethylene and of an unsaturated epoxide, mention may be made, for example, of copolymers of ethylene, of an alkyl (meth)acrylate and of an unsaturated epoxide or copolymers of ethylene, of a saturated carboxylic acid vinyl ester and of an unsaturated epoxide. The amount of epoxide can be up to 15% by weight of the copolymer and the amount of ethylene at least 50% by weight.

(A) is advantageously a copolymer of ethylene, of an alkyl (meth)acrylate and of an unsaturated epoxide.

The alkyl (meth)acrylate is preferably such that the alkyl has 2 to 10 carbon atoms.

The MFI (melt flow index) of (A) can be, for example, between 0.1 and 50 (g/10 min at 190° C. under 2.16 kg).

Examples of alkyl acrylate or methacrylate which can be used are in particular methyl methacrylate, ethyl acrylate, n-butyl acrylate, isobutyl acrylate or 2-ethylhexyl acrylate. Examples of unsaturated epoxides which can be used are in particular:

- aliphatic glycidyl esters and ethers, such as allyl glycidyl ether, vinyl glycidyl ether, glycidyl maleate and itaconate, or glycidyl acrylate and methacrylate, and
- alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

According to another form of the invention, (A) is a product having two epoxide functional groups, such as, for example, bisphenol A diglycidyl ether (BADGE).

Mention may be made, by way of examples of (B), are those comprising ethylene and an unsaturated carboxylic acid anhydride.

The polyolefin can be chosen from the polyolefins mentioned above which have to be grafted with an unsaturated epoxide.

The examples of unsaturated dicarboxylic acid anhydrides which can be used as constituents of (B) are in particular maleic anhydride, itaconic anhydride, citraconic anhydride or tetrahydrophthalic anhydride.

Mention may be made, by way of examples, of copolymers of ethylene, of an alkyl (meth)acrylate and of an unsaturated carboxylic acid anhydride and copolymers of ethylene, of a saturated carboxylic acid vinyl ester and of an unsaturated carboxylic acid anhydride.

The amount of unsaturated carboxylic acid anhydride can be up to 15% by weight of the copolymer and the amount of ethylene at least 50% by weight.

(B) is advantageously a copolymer of ethylene, of an alkyl (meth)acrylate and of an unsaturated carboxylic acid anhydride. The alkyl (meth)acrylate is preferably such that the alkyl has 2 to 10 carbon atoms.

The alkyl (meth)acrylate can be chosen from those mentioned above.

The MFI of (B) can be, for example, between 0.1 and 50 (g/10 min at 190° C. under 2.16 kg).

As regards (C) comprising an unsaturated carboxylic acid, mention may be made, by way of example, of the completely or partially hydrolysed (B). (C) is, for example, a copolymer of ethylene and of an unsaturated carboxylic acid and advantageously a copolymer of ethylene and of (meth) acrylic acid.

These copolymers have an MFI of between 0.1 and 50 (g/10 min at 190° C. under 2.16 kg).

The amount of acid can be up to 10% by weight and preferably 0.5 to 5%. The amount of (meth)acrylate is from 5 to 40% by weight.

(C) can also be chosen from $\alpha,\omega$-aminocarboxylic acids, such as, for example, $NH_2$—$(CH_2)_5COOH$, $NH_2$—$(CH_2)_{10}COOH$ and $NH_2(CH_2)_{11}$—$COOH$ and preferably aminoundecanoic acid.

The proportion of (A) and (B) necessary in order to form the crosslinked phase is determined according to the usual rules of the art by the number of reactive functional groups present in (A) and in (B).

For example, in the crosslinked phases comprising (C) chosen from $\alpha,\omega$-aminocarboxylic acids, if (A) is a copolymer of ethylene, of an alkyl (meth)acrylate and of an unsaturated epoxide and (B) a copolymer of ethylene, of an alkyl (meth)acrylate and of an unsaturated carboxylic acid anhydride, the proportions are such that the ratio of the anhydride functional groups to the epoxy functional groups is in the region of 1.

The amount of $\alpha,\omega$-aminocarboxylic acid is then from 0.1 to 3% and preferably 0.5 to 1.5% of (A) and (B).

As regards (C) comprising an unsaturated carboxylic acid, that is to say (C) being chosen, for example, from ethylene/ alkyl (meth)acrylate/acrylic acid copolymers, the amount of (C) and (B) can be chosen so that the number of acid functional groups and of anhydride functional groups is at least equal to the number of epoxide functional groups and use is advantageously made of products (B) and (C) such that (C) represents 20 to 80% by weight of (B) and preferably 20 to 50%.

It would not be departing from the scope of the invention if, in addition to (C), a catalyst were added.

These catalysts are generally used for reactions between the epoxys and the anhydrides.

Mention may be made, among the compounds capable of accelerating the reaction between the epoxy functional group present in (A) and the anhydride or acid functional group present in (B), of in particular:

- tertiary amines, such as dimethyllaurylamine, dimethylstearylamine, N-butylmorpholine, N,N-dimethylcyclohexylamine, benzyldimethylamine, pyridine, 4-(dimethylamino)pyridine, 1-methylimidazole, tetramethylethylhydrazine, N,N-dimethylpiperazine, N,N,N',N'-tetramethyl-1,6-hexanediamine, or a mixture of tertiary amines having from 16 to 18 carbons and known under the name of dimethyltallowamine
- 1,4-diazabicyclo[2.2.2]octane (DABCO)
- tertiary phosphines, such as triphenylphosphine
- zinc alkyldithiocarbamates.

The amount of these catalysts is advantageously from 0.1 to 3% and preferably 0.5 to 1% of (A)+(B)+(C).

The amount of crosslinked phase present in the thermoplastic polymer depends on the properties desired for the composition. The crosslinked phase can be from a few % up to 80% by weight of the composition, that is to say of the combined thermoplastic polymer and crosslinked phase.

The compositions of the invention are prepared in the molten state in extruders or kneaders according to the usual techniques for thermoplastics. They are available in the form of granules. It is subsequently sufficient to melt these granules, for example in an extruder which feeds, for example, an extrusion blow-moulding device. The compositions of the invention can also be prepared directly by adding the various constituents to an extruder which feeds the extrusion blow-moulding device.

In the latter case, the extruder must be suited to the conditions for mixing and reacting the precursors of the crosslinked phase.

It is therefore clear that the compositions of the invention are thermoplastic compositions.

The compositions of the invention can also comprise fillers, flame-retardants, release or antiblocking agents, antioxidants and U.V. inhibitors.

As regards polyamides, advantageous compositions are such that:

the thermoplastic polymer is chosen from polyamide-6 (PA-6), polyamide-12 (PA-12), polyamide-6,6, 6/12 copolyamide and polyamide-11 the polymer (A) is an ethylene/alkyl (meth)acrylate/ glycidyl (meth)acrylate copolymer comprising 5 to 40% by weight of (meth)acrylate and 0.1 to 10% by weight of epoxide and having an MFI of between 0.1 and 20 (in g/10 min at 190° C. under 2.16 kg)

the polymer (B) is an ethylene/alkyl (meth)acrylate/ maleic anhydride copolymer comprising 5 to 40% by weight of (meth)acrylate and 0.1 to 10% by weight of anhydride and having an MFI of between 0.1 and 20 (in g/10 min at 190° C. under 2.16 kg)

the polymer (C) is an ethylene/alkyl (meth)acrylate/ (meth)acrylic acid copolymer comprising 5 to 40% by weight of (meth)acrylate and 0.1 to 10% by weight of acid and having an MFI of between 0.1 and 20 (in g/10 min at 190° C. under 2.16 kg).

The amount of crosslinked phase (A)+(B)+(C) can be (by weight) from 10 to 60% per 90 to 40% of polyamide and preferably 30 to 45 per 70 to 55% of polyamide.

The advantage of the compositions of the invention is the certainty of obtaining a crosslinked phase within a wide range of operation of the extruder and that they are easily able to form granules.

The appearance of the pipes obtained by extrusion of the compositions of the invention is excellent.

EXAMPLES

The products used are referred to in the following way:
Amino 11=aminoundecanoic acid
PA 1=Polyamide-6 with an MFI of between 17 and 20 (under 235° C./2.16 kg).
Lotader 2: Ethylene/ethyl acrylate/maleic anhydride copolymer with a composition by weight of 70.9/27.6/ 1.5 and with an MFI of 7 (measured under 190° C./2.16 kg).
Lotader 3: Ethylene/methyl acrylate/glycidyl methacrylate copolymer with a composition by weight of 64.2/ 28/7.8 and with an MFI of 7 (measured under 190° C./2.16 kg).
Anti 51 refers to Irganox 1098 from Ciba.
Anti 82 refers to Hostanox PAR 24 from Hoechst.
XX1275 refers to a crosslinking accelerator of dimethyltallowamine (DMT) type in the form of a masterbatch MB in Lotader 2.
Lucalene 3110: Ethylene/butyl acrylate/acrylic acid copolymer with a composition by weight of 88/8/4 (BASF). MFI 6 to 8 (190° C./2.16 kg)
XX1325: DABCO in the form of a masterbatch in Lotader 2 (80/20).

The constituents of the compositions of the invention are introduced in the form of a dry blend or via independent metering devices into the hopper of a Werner-Pfleiderer corotating twin-screw extruder with a diameter of 40 mm, L/D=40 (9 barrel sections+4 spacers, i.e. a total length of 10 barrel sections). The total throughput of the extruder can be chosen at 50, 65 and 80 kg/hour.

The results are reported in Table 1. The compositions are in weight %.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/10895, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

TABLE 1

| Examples | H | A | B | C | D | E | F | G |
|---|---|---|---|---|---|---|---|---|
| PA1 | 54.6 | 54.6 | 54.6 | 54.6 | 54.6 | 54.6 | 54.6 | 54.6 |
| Lotader 2 | 33.53 | 33.9 | 34.42 | 34.29 | 34.07 | 22.36 | 22.36 | 0 |
| Lotader 3 | 9.83 | 10.13 | 10.06 | 10.03 | 10.18 | 9.83 | 11.17 | 10.7 |
| XX1275 (MB with DMT) | 1.34 | | | | | 1.34 | | |
| XX1325 (MB with DABCO) | | 0.67 | | | | | | |
| Amino 11 | | | 0.22 | 0.11 | 0.45 | | | |
| Lucalene 3110 | | | | | | 11.17 | 11.17 | 34 |
| Anti 51 | 0.5 | 0.5 | 0.5 | 0.5 | 0.5 | 0.5 | 0.5 | 0.5 |
| Anti 82 | 0.2 | 0.2 | 0.2 | 0.2 | 0.2 | 0.2 | 0.2 | 0.2 |
| | 1.34% DMT | 0.67% DABCO | 0.22% A 11 | 0.11% A 11 | 0.45% A 11 | 50% lucalene with cata | 50% lucalene without cata | 100% lucalene without cata |
| MFI, 235° C., 5 kg, non-stoved | | | | | | | | |
| at 50 kg/h | product not | 0.25 | 3.21 | 1.63 | 3.84 | 2.55 | 2.6 | 0.89 |
| at 65 | able to form | 0.11 | | | 3.74 | 2.56 | 2.6 | |
| at 80 | granules not measurable | 0.16 | | | 0.6 | 2.63 | 2.65 | |

TABLE 1-continued

| Examples | H | A | B | C | D | E | F | G |
|---|---|---|---|---|---|---|---|---|
| % water | | 0.2 | 0.22 | 0.25 | 0.2 | 0.28 | 0.28 | 0.202 |
| Pipe appearance | | nice appearance | excellent | nice appearance | excellent | excellent | excellent | excellent |
| MFI, 235° C., 5 kg, dried | | | | | | | | |
| at 50 kg/h | not measurable | 0.29 | 2.4 | 1.6 | 3.5 | 2.2 | 2.4 | 0.79 |
| at 65 | | 0.13 | 1.5 | | 2.4 | 2.2 | 2.3 | |
| at 80 | | 0.18 | 0.83 | | 0.57 | 2.3 | 2.4 | |
| % H$_2$O | | 0.06 | 0.035 | 0.04 | 0.05 | 0.05 | 0.05 | 0.055 |

What is claimed is:

1. A thermoplastic composition comprising a thermoplastic polymer, having incorporated therein a crosslinked phase from a reaction of:
   (A) a copolymer made from ethylene and an unsaturated epoxide, a polyolefin grafted with an unsaturated epoxide, or a product having two epoxide groups,
   (B) a copolymer made from ethylene and an unsaturated carboxylic acid anhydride, and
   (C) a copolymer made from an unsaturated carboxylic acid, or an α,ω-aminocarboxylic acid,
   wherein the weight ratio of (C)/(B) is 0.2:1–0.5:1.

2. A thermoplastic composition comprising a thermoplastic polymer, having incorporated therein a crosslinked phase from a reaction of:
   (A) a copolymer made from ethylene/alkyl (meth)acrylate/glycidyl (meth)acrylate,
   (B) a copolymer made from unsaturated carboxylic acid anhydride, and
   (C) a copolymer made from unsaturated carboxylic acid, or an α,ω-aminocarboxylic acid.

3. A composition according to claim 1, wherein (A) is a copolymer made from ethylene/alkyl (meth)acrylate/glycidyl (meth)acrylate.

4. A composition according to claim 1, wherein (A) is either a copolymer made from ethylene and an unsaturated epoxide, a polyolefin grafted with an unsaturated epoxide, or a product having two epoxide groups, and (C) is a partially or completely hydrolyzed copolymer made from ethylene and an unsaturated carboxylic acid anyhdride, a partially or completely hydrolyzed copolymer of a polyolefin grafted with an unsaturated carboxylic acid anhydride, or an α,ω-aminocarboxylic acid.

5. A composition according to claim 2, wherein (B) is either a copolymer made from ethylene and an unsaturated carboxylic acid anhydride, or a polyolefin grafted with an unsaturated carboxylic acid anhydride, and (C) is a partially or completely hydrolyzed copolymer made from ethylene and an unsaturated carboxylic acid, a partially or completely hydrolyzed copolymer of a polyolefin grafted with an unsaturated carboxylic acid anhydride, or an alpha, α,ω-aminocarboxylic acid.

6. A composition according to claim 1, wherein (C) is a copolymer made from ethylene/alkyl (meth)acrylate/(meth)acrylic acid.

7. A composition according to claim 2, wherein (C) is a copolymer made from ethylene/alkyl (meth)acrylate/(meth)acrylic acid.

8. A composition according to claim 3, wherein (C) is a copolymer made from ethylene/alkyl (meth)acrylate/(meth)acrylic acid.

9. A composition according to claim 4, wherein (C) is a copolymer made from ethylene/alkyl (meth)acrylate/(meth)acrylic acid.

10. A composition according to claim 5, wherein (C) is a copolymer made from ethylene/alkyl (meth)acrylate/(meth)acrylic acid.

11. A composition according to claim 1, wherein the thermoplastic polymer is a polyamide or a saturated polyester.

12. A composition according to claim 2, wherein the thermoplastic polymer is a polyamide or a saturated polyester.

13. A composition according to claim 4, wherein (C) is an α,ω-aminocarboxylic acid.

14. A composition according to claim 4, wherein (C) is an aminoundecanoic acid.

15. A composition according to claim 4, wherein (C) is said copolymer made from ethylene and unsaturated carboxylic acid.

16. A composition according to claim 15, wherein (A) is a copolymer made from ethylene and glycidyl methacrylate.

17. A composition according to claim 1, wherein (B) is a copolymer made from ethylene and maleic anhydride.

18. A composition according to claim 16, wherein (B) is a copolymer made from ethylene and maleic anhydride.

19. A composition according to claim 18, wherein (C) is a copolymer made from ethylene/alkyl (meth)acrylate/(meth)acrylic acid.

20. A thermoplastic composition comprising a thermoplastic polymer, having incorporated therein a crosslinked phase from a reaction of:
   (A) a copolymer of ethylene and an unsaturated epoxide, a polyolefin grafted with an unsaturated epoxide, or a product having two epoxide groups,
   (B) a copolymer of ethylene and an unsaturated carboxylic acid anhydride, and
   (C) a copolymer of an unsaturated carboxylic acid, or an α,ω-aminocarboxylic acid,
   wherein the weight ratio of (C)/(B) is 0.2:1–0.5:1.

21. A thermoplastic composition comprising a thermoplastic polymer, having incorporated therein a crosslinked phase from a reaction of:
   (A) an ethylene/alkyl (meth)acrylate/glycidyl (meth)acrylate copolymer,
   (B) a copolymer of an unsaturated carboxylic acid anhydride, and
   (C) a copolymer of an unsaturated carboxylic acid, or an α,ω-aminocarboxylic acid.

22. A composition according to claim 1, wherein (A) is a copolymer made from ethylene/methyl acrylate/glycidyl methacrylate and, (B) is a copolymer made from ethylene/ethyl acrylate/maleic anhydride.

23. A composition according to claim 22, wherein (C) is a copolymer made from ethylene/alkyl (meth)acrylate/(meth)acrylic acid, or α,ω-amino carboxylic acid.

24. A thermoplastic composition comprising a thermoplastic polymer, having incorporated therein a crosslinked phase from a reaction of components consisting essentially of:

(A) a copolymer made from ethylene and an unsaturated epoxide, a polyolefin grafted with an unsaturated epoxide, or a product having two epoxide groups, (B) a copolymer made from ethylene and an unsaturated carboxylic acid anhydride, and (C) a copolymer made from an unsaturated carboxylic acid, or an α,ω-aminocarboxylic acid, wherein the weight ratio of(C)/(B) is 0.2:1–0.5:1.

25. A thermoplastic composition comprising a thermoplastic polymer, having incorporated therein a crosslinked phase from a reaction of components consisting of:

(A) a copolymer made from ethylene and an unsaturated epoxide, a polyolefin grafted with an unsaturated epoxide, or a product having two epoxide groups, (B) a copolymer made from ethylene and an unsaturated carboxylic acid anhydride, (C) a copolymer made from an unsaturated carboxylic acid, or an α,ω-aminocarboxylic acid, wherein the weight ratio of (C)/(B) is 0.2:1–0.5:1.

26. A composition according to claim 20, wherein the thermoplastic polymer is a polyamide, (A) is the copolymer made from ethylene and glycidyl methacrylate or the polyolefin is ethylene grafted with glycidyl methacrylate; (B) is the copolymer made from ethylene and maleic anhydride; and (C) is the copolymer made from ethylene and acrylic acid, or ethylene and methacrylic acid.

* * * * *